United States Patent
Xing et al.

(10) Patent No.: US 10,257,876 B2
(45) Date of Patent: Apr. 9, 2019

(54) PARALLEL MULTIUSER DATA TRANSMISSION METHOD AND PRIMARY NODE

(71) Applicant: ZTE CORPORATION, Shenzhen (CN)

(72) Inventors: Weimin Xing, Shenzhen (CN); Kaibo Tian, Shenzhen (CN); Nan Li, Shenzhen (CN); Kaiying Lv, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 33 days.

(21) Appl. No.: 15/510,793

(22) PCT Filed: Mar. 23, 2015

(86) PCT No.: PCT/CN2015/074890
§ 371 (c)(1),
(2) Date: Mar. 13, 2017

(87) PCT Pub. No.: WO2016/037480
PCT Pub. Date: Mar. 17, 2016

(65) Prior Publication Data
US 2017/0257902 A1    Sep. 7, 2017

(30) Foreign Application Priority Data
Sep. 12, 2014 (CN) .......................... 2014 1 0466193

(51) Int. Cl.
*H04W 84/12* (2009.01)
*H04W 76/15* (2018.01)
(Continued)

(52) U.S. Cl.
CPC ........... *H04W 76/15* (2018.02); *H04L 1/1614* (2013.01); *H04L 1/1887* (2013.01);
(Continued)

(58) Field of Classification Search
CPC .......... H04W 76/025; H04W 72/0446; H04W 84/12
See application file for complete search history.

(56) References Cited

U.S. PATENT DOCUMENTS 8,306,010 B2    11/2012    Gong et al.
8,369,303 B2    2/2013    Gong et al.
(Continued)

FOREIGN PATENT DOCUMENTS

| CN | 102237920 A | 11/2011 |
| CN | 102412944 A | 4/2012 |
| CN | 103004105 A | 3/2013 |

OTHER PUBLICATIONS

PCT International Search Report dated Jun. 30, 2015, Application No. PCT/CN2015/074890, 3 pages.
(Continued)

*Primary Examiner* — Chi Ho A Lee
(74) *Attorney, Agent, or Firm* — Plumsea Law Group, LLC (57) ABSTRACT

A method for implementing parallel multi-user data transmission and a primary node are disclosed. The method includes: a primary node receiving uplink parallel multi-user data; and the primary node using a radio frame carrying multiple pieces of user data acknowledgement/paging information as a feedback frame to acknowledge the received uplink parallel multi-user data, and indicate respectively whether each of users is able to continue to send uplink data.

20 Claims, 4 Drawing Sheets

(51) Int. Cl.
  *H04W 72/04* (2009.01)
  *H04L 1/16* (2006.01)
  *H04L 1/18* (2006.01)

(52) U.S. Cl.
  CPC ....... *H04L 1/1896* (2013.01); *H04W 72/0446* (2013.01); *H04W 84/12* (2013.01)

(56) References Cited

U.S. PATENT DOCUMENTS

| | | | |
|---|---|---|---|
| 8,982,758 B2 | 3/2015 | Gong et al. | |
| 2010/0165939 A1* | 7/2010 | Lin | H04L 1/1854 370/329 |
| 2012/0177018 A1* | 7/2012 | Abraham | H04L 1/0027 370/338 |
| 2012/0188926 A1* | 7/2012 | Li | H04L 1/1614 370/311 |
| 2013/0058293 A1* | 3/2013 | Nishikawa | H04W 52/346 370/329 |
| 2013/0229996 A1 | 9/2013 | Wang et al. | |
| 2013/0286959 A1 | 10/2013 | Lou et al. | |
| 2014/0369338 A1* | 12/2014 | Grandhi | H04L 1/1664 370/338 |
| 2015/0055519 A1* | 2/2015 | Lin | H04L 1/1607 370/280 |
| 2015/0085777 A1* | 3/2015 | Seok | H04W 52/0216 370/329 |
| 2015/0222346 A1* | 8/2015 | Garrett | H04B 7/0617 370/329 |
| 2017/0346613 A1* | 11/2017 | Fan | H04L 1/1861 |
| 2017/0373799 A1* | 12/2017 | Noh | H04L 1/1614 |
| 2018/0152922 A1* | 5/2018 | Prasad | H04W 52/346 |

OTHER PUBLICATIONS

Extended European Search Report dated Jul. 7, 2017, Application No. EP 158404632, 10 pages.
Chun et al., "Consideration on UL MU Transmission," Doc: IEEE 11-14/0802r0, IEEE-SA Mentor, Piscataway, NJ, USA, vol. 802.11ax, Jul. 14, 2014, 10 Pages.
Chun et al., "Uplink Multi-user Transmission," Doc: IEEE 11-13/1388r0, IEEE-SA Mentor, Piscataway, NJ, USA, vol. 802.11 HEW, Nov. 11, 2013, 18 Pages.

* cited by examiner

PARALLEL MULTIUSER DATA TRANSMISSION METHOD AND PRIMARY NODE

CROSS-REFERENCE TO RELATED APPLICATIONS

This application is a U.S. national phase of PCT Application No. PCT/CN2015/074890 filed on Mar. 23, 2015, which claims priority to Chinese Patent Application No. 201410466193.X filed on Sep. 12, 2014, the disclosures of which are incorporated in their entirety by reference herein.

TECHNICAL FIELD

The present document relates to the field of wireless local area network technology.

BACKGROUND

At present, as more people use wireless local area networks (WLANs) for data communication, WLAN load has been constantly aggravated. Moreover, as the number of WLAN users increases, efficiency of data communication using the WLANs will decrease significantly as well. In such case, the problem of decrease of the efficiency of data communication using the WLANs cannot be prevented to occur purely by improving data rate of the WLANs.

Therefore, the IEEE standards organization establishes the related task groups to engage in resolving the problem of the efficiency of the WLANs. Multi-user data transmission, as one of alternative technologies to resolve the efficiency of the networks, has aroused wide attention and research. At present, the parallel multi-user data transmission technology studied by the HEW group includes spatial domain multiple access, i.e., multi-user multi-input multi-output (MU-MIMO) technology, frequency domain multiple access, i.e., orthogonal frequency division multiple access technology (OFDMA) and code division domain multiple access, i.e., interleave division multiple access technology.

Figure 1:
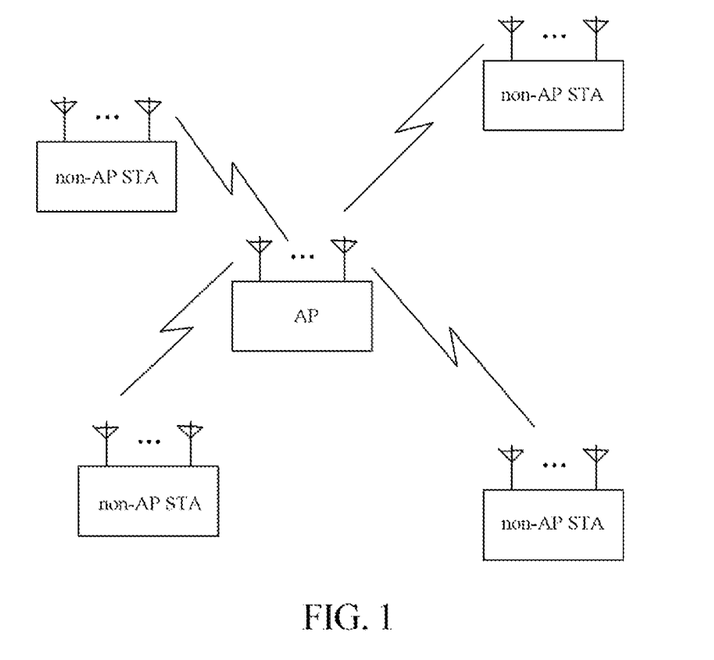
FIG. 1 is a schematic diagram of composition of a basic service set in the existing WLANs.

FIG. 1 is a schematic diagram of a basic service set in the WLANs. As shown in FIG. 1, in the WLANs, an access point (AP) and a plurality of non-access point station (non-AP STA) associated with the AP compose a basic service set (BSS). Typically, the parallel multi-user data transmission mentioned in the WLANs means that a plurality of secondary nodes send data to a primary node simultaneously, and is also referred to as an uplink multi-user data transmission, or means that a primary node send data to a plurality of secondary nodes simultaneously, and is also referred to as a downlink multi-user data transmission. The primary node typically refers to an AP or a non-AP STA with special ability, and the secondary node typically refers to a non-AP STA.

It can be seen from the above analysis that the uplink multi-user data transmission used by the WLANs is the parallel multi-user data transmission, and can improve effectively the efficiency of the WLANs. However, at present in the related art, specific technical schemes for implementing the parallel multi-user data transmission have not been provided yet, and the response and paging of successive multi-user multi-frame transmission cannot be achieved either. That is, there are still many problems to be solved, such as, how does the AP respond to data of multiple uplink users; how to avoid interference between the uplink multi-user data transmissions, and synchronization between multi-user data transmissions; and how to reduce competitive overhead of multi-user transmission, and how to achieve uplink multi-user multi-frame transmission after one success of competition.

In summary, the related art cannot ensure implementation of the parallel multi-user data transmission in the WLANs.

SUMMARY

The following is a summary of the subject matter described by the present document in detail herein. The summary is not intended to limit the protection scope of claims.

An embodiment of the present document provides a method for implementing parallel multi-user data transmission and a primary node, so as to ensure the implementation of the parallel multi-user data transmission in the WLANs.

An embodiment of the present document provides a method for implementing parallel multi-user data transmission and the method includes: a primary node receiving uplink parallel multi-user data; and the primary node using a radio frame carrying multiple pieces of user data acknowledgement/paging information as a feedback frame to acknowledge the received uplink parallel multi-user data, and indicate respectively whether each of users is able to continue to send uplink data.

A sending mode adopted by the feedback frame is: sending using a frame format decodable by all WLAN devices; sending using a downlink parallel multi-user manner.

The downlink parallel multi-user manner is a downlink orthogonal frequency division multiple access (OFDMA) manner, a downlink multi-user multi-input multi-output (MU-MIMO) manner, or a downlink interleave-division multiple-access (IDMA) manner.

The feedback frame includes at least a frame head and a frame body, herein the frame head includes a sending address field and a receiving address field, herein the sending address field is used for indicating address information of a device sending the feedback frame, and the receiving address field is used for indicating destination information of receiving the feedback frame; and the frame body includes an acknowledgement/paging control field and N user data acknowledgement/paging information fields, herein each of the user data acknowledgement/paging information fields corresponds to one user in uplink multi-user data transmission, and N represents the total number of the users and is an integer greater than or equal to 2.

In an exemplary embodiment, each of the user data acknowledgement/paging information fields includes a paging indication field used for indicating whether a user corresponding to said user data acknowledgement/paging information field is able to send the uplink data in a subsequent uplink multi-user radio frame.

In an exemplary embodiment, the acknowledgement/paging control field includes a multi-user paging indication field used for indicating respectively whether each of the users is able to send the uplink data in a subsequent uplink multi-user radio frame.

In an exemplary embodiment, a mode of the multi-user paging indication field indicating whether each of the users is able to send the uplink data in the subsequent uplink multi-user radio frame is: indicating that the number of the users who are allowed to send the uplink data in the subsequent uplink multi-user radio frame is M, and then the first M corresponding users in the N user data acknowledgement/paging information fields are allowed to send the uplink data in the subsequent uplink multi-user radio frame, herein M is less than or equal to N.

The acknowledgement/paging control field further includes a frame format control field and a number field of the user data acknowledgement/paging information field, herein the frame format control field is used for indicating that the feedback frame is used for acknowledgement/paging of the uplink multi-user data, and the number field of the user data acknowledgement/paging information field is used for indicating the number of the user data acknowledgement/paging information fields, a value of the number field of the user data acknowledgement/paging information field is the number N of the users in the uplink multi-user data transmission.

The user data acknowledgement/paging information field further includes a user identity field, a traffic stream identity field, acknowledgement information sequence control information and an acknowledgement information bitmap, herein the user identity field is used for representing the user corresponding to the user data acknowledgement/paging information field, the traffic stream identity field is used for representing an identity of a traffic stream in which a data unit corresponding to a right and wrong indication in the acknowledgement information bitmap is located, the acknowledgement information sequence control information is used for representing a sequence number range of the data unit corresponding to the right and wrong indication in the acknowledgement information bitmap, and the acknowledgement information bitmap is a bit map and each bit corresponds to a right and wrong indication of one data unit in the traffic stream.

The frame head further includes a frame control field used for indicating that a frame in which the frame control field is located is the feedback frame carrying the multiple pieces of user data acknowledgement/paging information; and the frame head further includes a duration field used for determining a length of an uplink multi-user radio frame for the users who are indicated to be able to send the uplink data in the next uplink multi-user data transmission.

The feedback frame further includes a frame check.

The parallel multi-user data transmission is in one transmission opportunity (TXOP) or service period; and the method further includes: time occupied by multi-user multi-frame exchange in the parallel multi-user data transmission is within a time threshold, herein the time threshold is a limit value of a duration of the TXOP or service period.

The time threshold is a fixed duration; or the time threshold is determined by data attributes, station attributes, or quality of service (QoS) requirements of the uplink multi-user.

The present document further provides a primary node which includes a receiving module and an acknowledgement/paging module. The receiving module is arranged to receive uplink parallel multi-user data. The acknowledgement/paging module is arranged to use a radio frame carrying multiple pieces of user data acknowledgement/paging information as a feedback frame to acknowledge the received uplink parallel multi-user data, and indicate respectively whether each of users is able to continue to send uplink data.

The acknowledgement/paging module is arranged to send the feedback frame using a downlink parallel multi-user manner of a frame format decodable by all WLAN devices, herein the feedback frame carries the multiple pieces of user data acknowledgement/paging information which acknowledge the received uplink parallel multi-user data and indicate whether to be able to send the uplink data.

The feedback frame includes at least a frame head and a frame body. The frame head includes a sending address field and a receiving address field, herein the sending address field is used for indicating address information of a device sending the feedback frame, and the receiving address field is used for indicating destination information of receiving the feedback frame. The frame body includes an acknowledgement/paging control field and N user data acknowledgement/paging information fields, herein each of the user data acknowledgement/paging information fields corresponds to one user in uplink multi-user data transmission, and N represents the total number of the users.

In an exemplary embodiment, each of the user data acknowledgement/paging information fields includes a paging indication field used for indicating whether a user corresponding to said user data acknowledgement/paging information field is able to send the uplink data in a subsequent uplink multi-user radio frame.

In an exemplary embodiment, the acknowledgement/paging control field includes a multi-user paging indication field used for indicating respectively whether each of the users is able to send the uplink data in a subsequent uplink multi-user radio frame.

In an exemplary embodiment, a mode of the multi-user paging indication field indicating whether each of the users is able to send the uplink data in the subsequent uplink multi-user radio frame is: indicating that the number of the users who are allowed to send the uplink data in the subsequent uplink multi-user radio frame is M, and then the first M corresponding users in the N user data acknowledgement/paging information fields are allowed to send the uplink data in the subsequent uplink multi-user radio frame, herein M is less than or equal to N.

The acknowledgement/paging control field further includes a frame format control field and a number field of the user data acknowledgement/paging information field, herein the frame format control field is used for indicating that the feedback frame is used for acknowledgement/paging of the uplink multi-user data, and the number field of the user data acknowledgement/paging information field is used for indicating the number of the user data acknowledgement/paging information fields, a value of the number field of the user data acknowledgement/paging information field is the number N of the users in the uplink multi-user data transmission.

The user data acknowledgement/paging information field further includes a user identity field, a traffic stream identity field, acknowledgement information sequence control information and an acknowledgement information bitmap, herein the user identity field is used for representing the users corresponding to the user data acknowledgement/paging information field, the traffic stream identity field is used for representing an identity of a traffic stream in which a data unit corresponding to a right and wrong indication in the acknowledgement information bitmap is located, the acknowledgement information sequence control information is used for representing a sequence number range of the data unit corresponding to the right and wrong indication in the acknowledgement information bitmap, and the acknowledgement information bitmap is a bit map and each bit corresponds to a right and wrong indication of one data unit in the traffic stream.

The frame head further includes a frame control field used for indicating that a frame in which the frame control field is located is the feedback frame carrying the multiple pieces of user data acknowledgement/paging information.

The frame head further includes a duration field used for determining a length of the uplink multi-user radio frame for the users who are indicated to be able to send the uplink data in the next uplink multi-user data transmission.

An embodiment of the present document further provides a computer readable storage medium storing computer executable instructions therein for executing the method described above.

Compared with the related art, the technique scheme of the present application includes: a primary node receives uplink parallel multi-user data; and the primary node uses a radio frame carrying multiple pieces of user data acknowledgement/paging information as a feedback frame, acknowledges the received uplink parallel multi-user data, and indicates respectively whether each of users is able to continue to send uplink data. Through the method of the present document, it is achieved that an AP responds to the data of the multiple uplink users, and at the same time indicates the next multi-user transmission, thereby ensuring the implementation of the parallel multi-user data transmission in the WLANs.

In an exemplary embodiment, by setting the duration field in the feedback frame in the present document, competition for data channels by stations or auditing stations which have no uplink data transmission requirements subsequently is shielded, competitive overhead of multi-user transmission is reduced, and the problem of how to complete uplink multi-user multi-frame transmission after one success of competition is solved, and at the same time interference between uplink multi-user data transmissions is avoided.

In an exemplary embodiment, since the feedback frame can carry adjustment information (used for uplink synchronization) of time/power/frequency for each of the users and resource allocation information, the interference between the uplink multi-user data transmissions is avoided, and at the same time synchronization between the multi-user data transmissions is ensured as well.

Features and advantages of the embodiments of the present document will be set forth in the following description. Other advantages of the embodiments of the present document may be implemented and obtained through structures pointed out particularly in the specification, claims and accompanying drawings.

Other aspects may be understood upon reading and understanding of the accompanying drawings and the detailed description.

BRIEF DESCRIPTION OF DRAWINGS

The accompanying drawings illustrated herein are intended to provide a further understanding of the embodiments of the present document and form a portion of the present application. The exemplary embodiments of the present document and description thereof are intended to explain the present document, and are not to construe an inappropriate limitation to the present document. In the drawings.

DETAILED DESCRIPTION

The technical scheme of embodiments of the present document will be described in further detail in conjunction with the accompanying drawings. It is should be noted that the embodiments of the present application and features in the embodiments can be combined with each other arbitrarily without conflict.

It should be noted also that the slash "/" is used to represent the meaning of "or".

Figure 2:
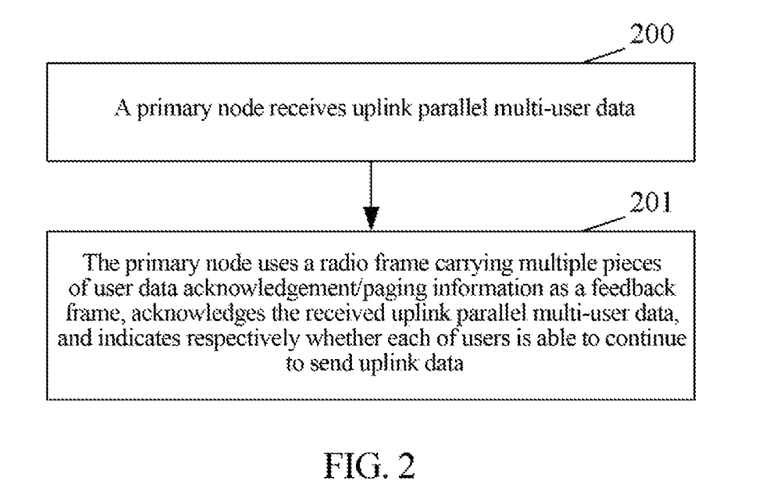
FIG. 2 is a flow chart of a method for implementing parallel multi-user data transmission according to an embodiment of the present document.

FIG. 2 is a flow chart of a method for implementing parallel multi-user data transmission according to an embodiment of the present document. As shown in FIG. 2, the method includes the following steps.

Step 201: a primary node receives uplink parallel multi-user data.

In uplink multi-user data transmission, a plurality of secondary nodes can send the uplink parallel multi-user data using an uplink multi-user radio frame in a manner such as an uplink OFDMA manner, an uplink MU-MIMO manner or an uplink DMA manner, and indicate in the currently sent data whether there is further uplink data to be sent therein. The specific implementation of the sending of the uplink parallel multi-user data pertains to well-known technologies of the art, is not intended to limit the protection scope of the present document, and will not repeated herein.

Step 201: the primary node uses a radio frame carrying multiple pieces of user data acknowledgement/paging information as a feedback frame to acknowledge the received uplink parallel multi-user data and indicate respectively whether each of users is able to continue to send the uplink data.

In this step, when the primary node uses a radio frame carrying multiple pieces of user data acknowledgement/paging information as a feedback frame to acknowledge the received uplink parallel multi-user data and indicate respectively whether each of users is able to continue to send the uplink data, the feedback frame is sent using the following manners.

The feedback frame is sent using a frame format decodable by all WLAN devices, such as using a non-HT manner or a non-HT repetitive manner, herein the non-HT, which is an abbreviation of non-high-throughput, is a basic format defined in 802.11a/g, and the non-HT repetitive manner means that a frame in the non-HT format is sent repeatedly over different channels.

The feedback frame is sent using a downlink parallel multi-user manner. Herein the feedback frame contains a plurality of independent data units sent in parallel independently. Each data unit is for one user and contains data acknowledgement information and paging indication for the user. Herein the downlink parallel multi-user manner may be a downlink OFDMA manner, a downlink MU-MIMO manner or a downlink DMA manner.

Figure 3:
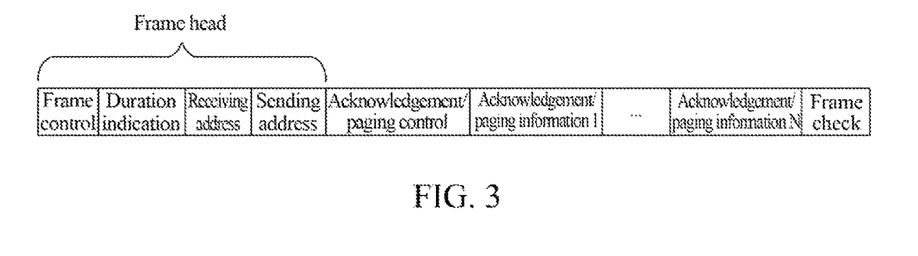
FIG. 3 is a schematic diagram of composition of a radio frame carrying multiple pieces of user data acknowledgement/paging information according to an embodiment of the present document.

The specific structure of the feedback frame in this step, as shown in FIG. 3, includes at least a frame head and a frame body.

The frame head includes a sending address field, a receiving address field and a frame control field.

The sending address field is used for indicating address information of a device sending the feedback frame.

The receiving address field is used for indicating destination information of receiving the feedback frame. Specifically, for the feedback frame carrying multiple pieces of user data acknowledgement/paging information, the destination information of the receiving address field may be set as a broadcast or multicast address. When the receiving address field is set as a multicast address, the destination information is multiple users in the uplink multi-user data transmission. Here, a plurality of stations (corresponding to multiple users) may be bound with a specific multicast address by managing frame interaction in advance, such that in the feedback frame the receiving address may be set as the multicast address, and generally the address refers to an MAC address.

The frame control field is used for indicating that a frame in which the frame control field is located is the feedback frame carrying the multiple pieces of user data acknowledgement/paging information, i.e., the frame control field containing parameters such as frame type/sub-frame type is used for indicating that the frame is of a newly defined frame type used for acknowledgement/paging of the uplink multi-user data.

It should be noted that the frame control field in the frame head may be used for indicating that the frame type is still indicated as the originally defined BA frame type, at which point, a certain information domain, such as frame format control field, in the frame body is used for indicating that this frame is a special variant of the BA, i.e., used for indicating this frame is of a newly defined frame type used for acknowledgement/paging of the uplink multi-user data.

In an exemplary embodiment, the frame head further includes a duration field used for determining a length of an uplink multi-user radio frame for the users who are indicated to be able to send the uplink data in the next uplink multi-user data transmission.

Figure 4:
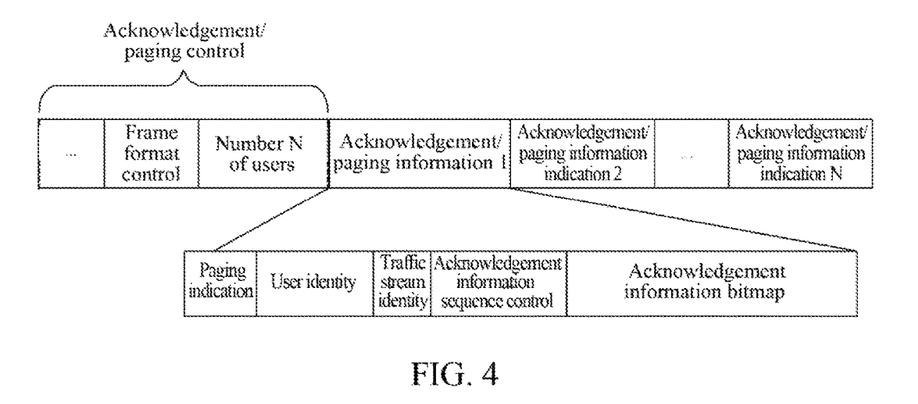
FIG. 4 is a schematic diagram of a first embodiment of a frame body in a radio frame carrying multiple pieces of user data acknowledgement/paging information according to an embodiment of the present document.

FIG. 4 is a structural schematic diagram of a first embodiment of a frame body in a radio frame carrying multiple pieces of user data acknowledgement/paging information according to the present document.

As shown in FIG. 4, the frame body includes an acknowledgement/paging control field and N user data acknowledgement/paging information fields. Herein each of the user data acknowledgement/paging information fields corresponds to one user in uplink multi-user data transmission, and N represents the total number of the users.

The acknowledgement/paging control field includes a frame format control field and a number field of the user data acknowledgement/paging information field, herein the frame format control field is used for indicating that the feedback frame is used for acknowledgement/paging of the uplink multi-user data, and the number field of the user data acknowledgement/paging information field is used for indicating the number of the user data acknowledgement/paging information fields, a value of the number field of the user data acknowledgement/paging information field is the number N of the users in the uplink multi-user data transmission.

The user data acknowledgement/paging information field includes a user identity field, a traffic stream identity field, acknowledgement information sequence control information, an acknowledgement information bitmap and a paging indication field.

The user identity field is used for representing the user corresponding to the user data acknowledgement/paging information field. Specifically, it may be an association identity (AID) of a user sending the uplink data, such as a secondary node.

The acknowledgement information bitmap is a bit map, and each bit corresponds to a right and wrong indication of one data unit in a traffic stream.

The traffic stream identity field is used for representing an identity of the traffic stream in which the data unit corresponding to the right and wrong indication in the acknowledgement information bitmap is located.

The acknowledgement information sequence control information is used for representing a sequence number range of the data unit corresponding to the right and wrong indication in the acknowledgement information bitmap.

The paging indication field is used for indicating whether a user corresponding to the user data acknowledgement/paging information field is able to send the uplink data in a subsequent uplink multi-user radio frame. Specifically, when the paging indication field is true, it indicates that the user can sent the uplink data in the subsequent uplink multi-user radio frame; and the paging indication field is false, it indicates that the user cannot sent the uplink data in the subsequent uplink multi-user radio frame.

Figure 5:
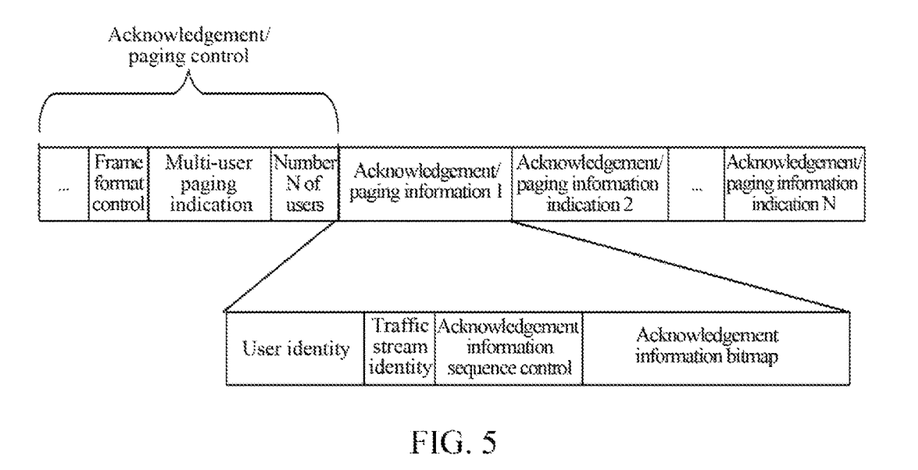
FIG. 5 is a schematic diagram of a second embodiment of a frame body in a radio frame carrying multiple pieces of user data acknowledgement/paging information according to an embodiment of the present document.

It should be noted that the paging indication field may also be set in the acknowledgement/paging control field. As shown in FIG. 5, FIG. 5 is a structural schematic diagram of a second embodiment of the frame body in the radio frame carrying multiple pieces of user data acknowledgement/paging information according to the present document. In the second embodiment, the acknowledgement/paging control field includes a multi-user paging indication field used for indicating whether each of the users is able to send the uplink data in the subsequent uplink multi-user radio frame. The indicating manner may be to set one bit for each user in this field to indicate whether the user is allowed to send the uplink data in the subsequent uplink multi-user radio frame or may be to indicate that the number of the users who are allowed to send the uplink data in the subsequent uplink multi-user radio frame is M. The first M corresponding users in the N user data acknowledgement/paging information fields are allowed by default to send the uplink data in the subsequent uplink multi-user radio frame, herein M is less than or equal to N.

In an exemplary embodiment, the feedback frame in this step further includes a frame check for determining whether the frame is received correctly to be checked. This is CRC check familiar to those skilled in the art, and how to implement it specifically is not intended to limit the protection scope of the present document and will not repeated herein.

It should be noted that in the structural schematic diagram of the feedback frame shown in FIGS. 3 to 5, the order of each of the information domains is not limited and those skilled in the art readily know that they can be recombined, and their specific ordering relationship is not intended to limit the protection scope of the present document and will not repeated herein.

Through the method according to the present, it is achieved that an AP responds to data of the multiple uplink users, and at the same time indicates the next multi-user transmission, thereby ensuring the implementation of the parallel multi-user data transmission in the WLANs.

In an exemplary embodiment, by setting the duration field in the feedback frame in the present document, competition for data channels by stations or auditing stations which have no uplink data transmission requirements subsequently is shielded, competitive overhead of multi-user transmission is reduced, and the problem of how to complete uplink multi-user multi-frame transmission after one success of competition is solved, and at the same time interference between uplink multi-user data transmissions is avoided.

In an exemplary embodiment, since the feedback frame can carry adjustment information (used for uplink synchronization) of time/power/frequency for each of the users and resource allocation information, the interference between the uplink multi-user data transmissions is avoided, and at the same time synchronization between the multi-user data transmissions is ensured as well.

Figure 6:
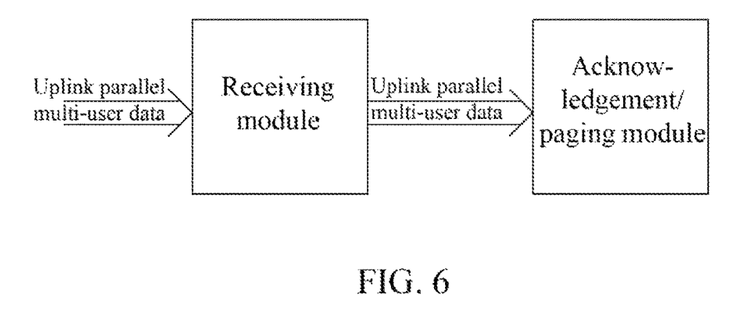
FIG. 6 is a schematic diagram of a structure of a primary node according to an embodiment of the present document.

FIG. 6 is a structural schematic diagram of a primary node according to the present document, and as shown in FIG. 6, the primary node includes at least a receiving module and an acknowledgement/paging module.

The receiving module is arranged to receive uplink parallel multi-user data; and The acknowledgement/paging module is arranged to use a radio frame carrying multiple pieces of user data acknowledgement/paging information as a feedback frame to acknowledge the received uplink parallel multi-user data, and indicate respectively whether each of users is able to continue to send uplink data.

The acknowledgement/paging module is arranged to send the feedback frame using a downlink parallel multi-user manner of a frame format decodable by all WLAN devices, herein the feedback frame carries the multiple pieces of user data acknowledgement/paging information which acknowledge the received uplink parallel multi-user data and indicate whether to be able to send the uplink data.

The method according to the embodiment of the present document will be described in detail in conjunction with the specific embodiments.

According to the protocol stipulation, when an AP establishes a BSS, an association authentication process will be performed between a plurality of non-AP STAs and the AP so as to compose a BSS. According to contents of the embodiment of the present document, in the association authentication process, there will be interaction ability information, containing an indication of whether the uplink multi-user transmission ability is supported, between the AP and each of the non-AP STAs. Assume that the AP and the non-AP STAs in the embodiment support the uplink multi-user transmission.

Figure 7:
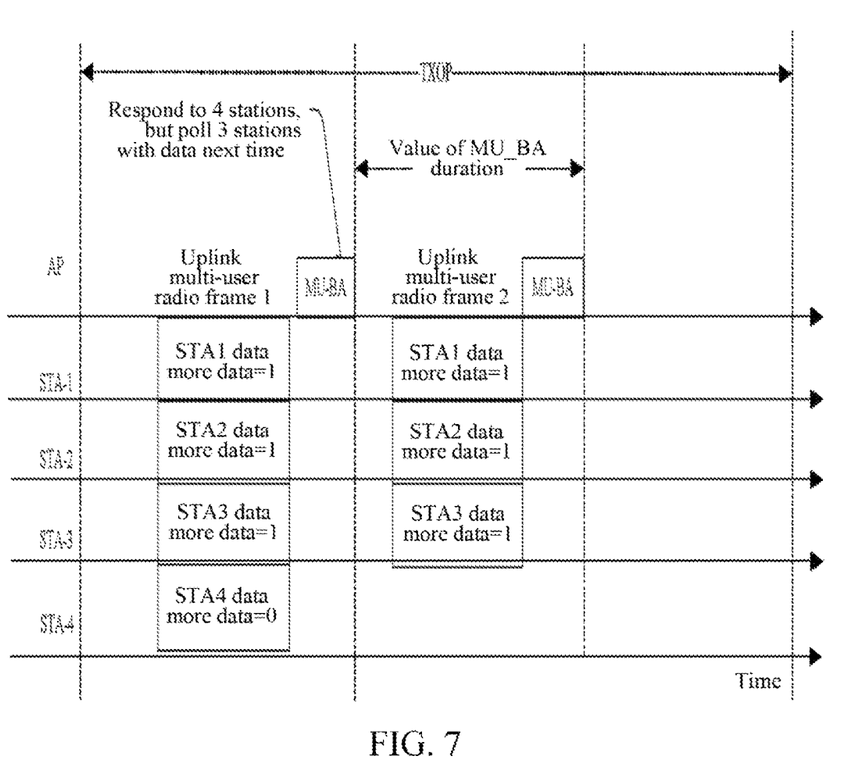
FIG. 7 is a schematic diagram of a first embodiment for implementing parallel multi-user data transmission according to an embodiment of the present document.

FIG. 7 is a schematic diagram of the first embodiment for implementing parallel multi-user data transmission according to the present document. As shown in FIG. 7, in the first embodiment, assume that association stations STA1~STA4 support the uplink multi-user data transmission and come to an agreement or negotiation with the AP respectively that supports the use of the feedback frame carrying the multiple pieces of user data acknowledgement/paging information.

First, in one transmission opportunity (TXOP), STA1, STA2, STA3 and STA4 send in the uplink an uplink multi-user radio frame 1 in parallel by an uplink OFDMA manner, uplink MU-MIMO manner or uplink DMA manner. It is assumed that the STA1, STA2 and SAT3 set respectively more data in their own data in the radio frame 1 as 1, indicating that there is still uplink data to be sent, and that STA4 sets more data to 0, indicating that the currently sent frame is the last frame, i.e., there is no cached uplink data to be sent. All the data sent by the STA1 STA4 is an aggregation MAC protocol data unit (A-MPDU) which means that a plurality of data units of one STA are aggregated into one frame for transmission, and the A-MPDU responds using block acknowledgement (i.e., multiple data unit acknowledgement) which is a bitmap, each bit corresponding to a data unit in one A-MPDU.

Then the AP receives the multi-user radio frame 1 and sends the feedback frame, the frame type or format of which is set as a radio frame used for acknowledgement/paging of the multi-user data, called MU_BA frame for short. In the MU_BA frame, acknowledgement information acknowledged by a data block in the radio frame 1 sent by each of the corresponding STA1~STA4 is included, and at the same time paging indication information for the STA1~STA4 is included as well, in order to trigger sending of a multi-user radio frame 2. According to the indication of more data in the radio frame 1, the paging indication information of the STA1~STA3 is set to be true, indicating that the STA1~STA3 may send data in the radio frame 2, and the paging indication information of the STA4 is set to be false, indicating that the STA4 cannot send data in the uplink.

A duration value, contained in a frame head of the MU_BA frame, is used for determining sending time of the multi-user radio frame 2 and for avoiding a reserved channel time of an access channel of a station except STA1~STA3. Particularly, the duration value may be a value of a product of a constant 2 and a short interframe space (SIFS), the desired sending time of the multi-user radio frame 2 and a value of a sum of sending time of the feedback frame of the radio frame 2. The desired sending time of the multi-user radio frame 2, determined by the AP itself, is a value calculated by multiple users. The sending time of the feedback frame of the radio frame 2 may be a time set according to the protocol in advance (the time of the feedback frame is relatively fixed), or be a time determined according to the preset rules. For example, the time of the next feedback frame may be defined as the sending time of the current feedback frame. That is, after the station receives a duration field, the value of the duration field subtracts the interframe space, and subtracts the preset time of the feedback frame, so as to obtain time limit of sending the radio frame 2 in the uplink.

After receiving the MU_BA frame, the STA1~STA3 determine whether the data sent by the multi-user radio frame 1 is correct according to their own acknowledgement information, and determine that uplink transmission is allowed according to the paging indication information, and thus at the same time transmit the multi-user radio frame 2 in the uplink after the SIFS, the transmission time being determined according to the duration value indicated in the MU_BA frame. After receiving the MU_BA frame, the STA4 determines whether the data sent by the multi-user radio frame 1 is correct according to its own acknowledgement information, and determines that uplink transmission is not allowed according to the paging indication information, thus the STA4 cannot perform the coming transmission. If other auditing stations receive the MU_BA frame and find that they cannot participate in the communication, then a timer (network allocation vector (NAV)) is set according to the duration value in the MU_BA frame. When the value of the timer is less than 0, the auditing stations cannot compete for the channel.

Thus, the AP and STAs repeat the process described above to achieve the multi-user multi-frame transmission in one transmission opportunity.

Figure 8:
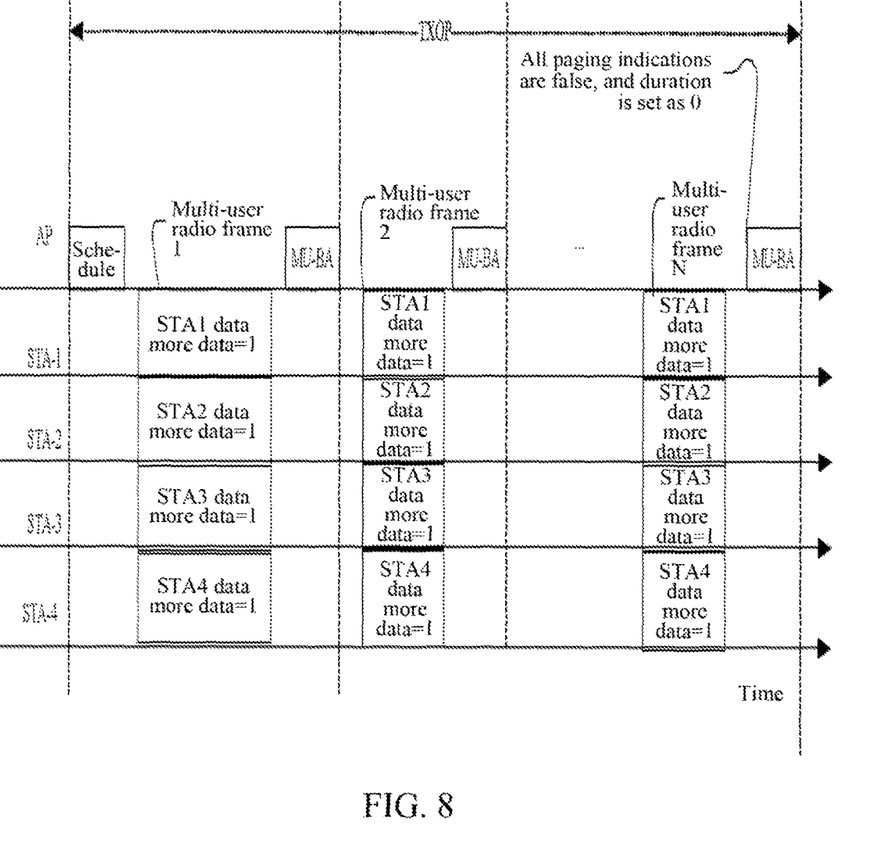
FIG. 8 is a schematic diagram of a second embodiment for implementing parallel multi-user data transmission according to an embodiment of the present document.

FIG. 8 is a schematic diagram of the second embodiment for implementing parallel multi-user data transmission according to an embodiment of the present document. As shown in FIG. 8, assume that in one TXOP or service period, STA1, STA2, STA3 and STA4 send in the uplink an uplink multi-user radio frame 1 in parallel and that the STA1~STA4 always has data to be sent, then more data in their own data in the uplink multi-user radio frame sent by them is indicated always as 1.

The AP receives the multi-user radio frame 1 in the figure and sends the feedback frame, the frame type or format of which is set as a block acknowledgement frame used for acknowledgement/paging of the multi-user data. Specifically, in the embodiment, the frame type/sub-frame type in a frame control field is set as the block acknowledgement frame, and frame format control in an acknowledgement/paging control field is set as a frame format for acknowledgement/paging of the multi-user data. There is an acknowledgement/paging indication corresponding to each station of the STA1~STA4 in the block acknowledgement frame. The specific frame indication will not be repeated herein.

In the embodiment, assume that the AP sets all paging indications of the four stations, i.e., STA1~STA4 to 1, then the STA1~STA4 will send their uplink data in the multi-user radio frame 2.

It should be noted that the duration of the TXOP or service period is limited, i.e., a time threshold, and time occupied by multi-user multi-frame exchange cannot exceed the time threshold. That is, when the STA1~STA4 has sent all the N multi-user radio frames, although more data is indicated as 1, in order to prevent the transmission time exceeding the time threshold of the TXOP or service period, in the feedback frame for acknowledgement/paging of the multi-user data fed back to the STA1~STA4, the AP sets paging indications of all the stations as false and sets the duration value as 0 for completing the multi-user multi-frame transmission. The time threshold of the TSOP or service period may be a fixed duration or may be determined by data attributes, station attributes or QoS requirements of the uplink multi-user. It should be noted that in the existing protocol, one type of QoS data is sent in one TXOP, and the duration that can be sent continuously is determined by the level of QoS grade and service transmission attributions. However, the uplink multi-user is involved in data of a plurality of stations, and various QoS requirements exist in different stations. At this time, the time threshold should be considered according to requirements of multiple users jointly. For example, the QoS can be determined according to data with the highest priority among the multi-user data, or the time threshold may be determined according to the data QoS of a specific STA, such as STA1. There are a lot of specific implementing schemes, emphasis herein is placed on joint consideration according to requirements of multiple users. The schemes are feasible, as long as those skilled in the art think that they are reasonable, and are not intended to limit the protection scope of the present document.

Thus, after receiving the feedback frame, the STA1~STA4 cannot send immediately the uplink multi-user data after the SIFS and the TXOP or service period ends. At this time, if the STA1~STA4 still have data to be sent, the STA1~STA4 can compete for time independently for uplink sending, and can also wait for the AP to begin uplink multi-user TXOP or service period again, i.e., wait re-paging of the AP.

The embodiment of the present document further provides a computer readable storage medium having stored computer executable instructions therein for executing the method described above.

The above description is only the alternative embodiments of the present document only and is not intended to limit the protection scope of the present document.

Those skilled in the art may understand that all or part of steps in the embodiment described above can be carried out using computer program flows. The computer program may be stored a computer readable medium and executed on a corresponding hardware platform (such as system, device, apparatus, appliance, etc.). When the computer program is executed, one of the steps or a combination thereof in the method embodiment may be executed.

In an exemplary embodiment, all or part of the steps in the embodiment described above may also be implemented using integrated circuits. These steps may be fabricated into separated integrated circuit modules respectively, or a plurality of modules or steps of them may be fabricated into a single integrated circuit module.

Various apparatus/functional modules/functional units in the embodiment described above may be implemented using general-purpose computing apparatuses, or they may be centralized on a single computing apparatus or may be distributed in a network composed of a plurality of computing apparatuses.

When various apparatus/functional modules/functional units in the embodiment described above is implemented in a form of software function module or sold or used as an independent product, they can be stored in a computer readable storage medium. The computer readable storage medium mention above may be a read only memory, a magnetic disk or optical disc.

INDUSTRIAL APPLICABILITY

The method for implementing parallel multi-user data transmission and the primary node provided by the embodiments of the present document can achieve that the AP responds to the data of the multiple uplink users, and at the same time indicates the next multi-user transmission, thereby ensuring the implementation of the parallel multi-user data transmission in the WLANs.

What is claimed is:

1. A method for implementing parallel multi-user data transmission, comprising:
    a primary node receiving uplink parallel multi-user data; and
    the primary node using a radio frame carrying multiple pieces of user data acknowledgement information and multiple pieces of paging information as a feedback frame, using the multiple pieces of user data acknowledgement information to acknowledge the received uplink parallel multi-user data, and using the multiple pieces of paging information to indicate respectively whether each of users is able to continue to send uplink data.

2. The method according to claim 1, wherein a sending mode adopted by the feedback frame is: sending using a frame format decodable by all wireless local area network, WLAN, devices;
    sending using a downlink parallel multi-user manner.

3. The method according to claim 2, wherein the downlink parallel multi-user manner is a downlink orthogonal frequency division multiple access, OFDMA, manner, a downlink multi-user multi-input multi-output, MU-MIMO, manner, or a downlink interleave-division multiple-access, IDMA, manner.

4. The method according to claim 1, wherein the feedback frame comprises at least a frame head and a frame body, wherein
the frame head comprises a sending address field and a receiving address field, wherein the sending address field is used for indicating address information of a device sending the feedback frame, and the receiving address field is used for indicating destination information of receiving the feedback frame; and
the frame body comprises an acknowledgement/paging control field and N user data acknowledgement/paging information fields, wherein each of the user data acknowledgement/paging information fields corresponds to one user in uplink multi-user data transmission, and N represents the total number of the users and is an integer great than or equal to 2.

5. The method according to claim 4, wherein
each of the user data acknowledgement/paging information fields comprises a paging indication field used for indicating whether a user corresponding to said user data acknowledgement/paging information field is able to send the uplink data in a subsequent uplink multi-user radio frame;
or, the acknowledgement/paging control field comprises a multi-user paging indication field used for indicating respectively whether each of the users is able to send the uplink data in a subsequent uplink multi-user radio frame.

6. The method according to claim 5, wherein
the acknowledgement/paging control field further comprises a frame format control field and a number field of the user data acknowledgement/paging information field, wherein the frame format control field is used for indicating that the feedback frame is used for acknowledgement/paging of the uplink multi-user data, and the number field of the user data acknowledgement/paging information field is used for indicating the number of the user data acknowledgement/paging information fields, a value of the number field of the user data acknowledgement/paging information field is the number N of the users in the uplink multi-user data transmission; and
the user data acknowledgement/paging information field further comprises a user identity field, a traffic stream identity field, acknowledgement information sequence control information and an acknowledgement information bitmap, wherein the user identity field is used for representing the user corresponding to the user data acknowledgement/paging information field, the traffic stream identity field is used for representing an identity of a traffic stream in which a data unit corresponding to a right and wrong indication in the acknowledgement information bitmap is located, the acknowledgement information sequence control information is used for representing a sequence number range of the data unit corresponding to the right and wrong indication in the acknowledgement information bitmap, and the acknowledgement information bitmap is a bit map and each bit corresponds to a right and wrong indication of one data unit in the traffic stream.

7. The method according to claim 4, wherein the frame head further comprises a frame control field used for indicating that a frame in which the frame control field is located is the feedback frame carrying the multiple pieces of user data acknowledgement/paging information.

8. The method according to claim 4, wherein the frame head further comprises a duration field used for determining a length of an uplink multi-user radio frame for the users who are indicated to be able to send the uplink data in the next uplink multi-user data transmission.

9. The method according to claim 4, wherein the feedback frame further comprises a frame check.

10. The method according to claim 1, wherein the parallel multi-user data transmission is in one transmission opportunity, TXOP, or service period; and
the method further comprises: time occupied by multi-user multi-frame exchange in the parallel multi-user data transmission is within a time threshold, wherein the time threshold is a limit value of a duration of the TXOP or service period.

11. The method according to claim 10, wherein the time threshold is a fixed duration; or
the time threshold is determined by data attributes, station attributes, or quality of service, QoS, requirements of the uplink multi-user.

12. The method according to claim 5, wherein a mode of the multi-user paging indication field indicating whether each of the users is able to send the uplink data in the subsequent uplink multi-user radio frame is: indicating that the number of the users who are allowed to send the uplink data in the subsequent uplink multi-user radio frame is M, and then the first M corresponding users in the N user data acknowledgement/paging information fields are allowed to send the uplink data in the subsequent uplink multi-user radio frame, wherein M is less than or equal to N.

13. A primary node, comprising a receiving module and an acknowledgement/paging module, wherein
the receiving module is arranged to receive uplink parallel multi-user data; and
the acknowledgement/paging module is arranged to use a radio frame carrying multiple pieces of user data acknowledgement information and multiple pieces of paging information as a feedback frame, using the multiple pieces of user data acknowledgement information to acknowledge the received uplink parallel multi-user data, and use the multiple pieces of paging information to indicate respectively whether each of users is able to continue to send uplink data.

14. The primary node according to claim 13, wherein the acknowledgement/paging module is arranged to send the feedback frame using a downlink parallel multi-user manner of a frame format decodable by all WLAN devices, wherein the feedback frame carries the multiple pieces of user data acknowledgement/paging information which acknowledge the received uplink parallel multi-user data and indicate whether to be able to send the uplink data.

15. The primary node according to claim 13, wherein the feedback frame comprises at least a frame head and a frame body, wherein
the frame head comprises a sending address field and a receiving address field, wherein the sending address field is used for indicating address information of a device sending the feedback frame, and the receiving address field is used for indicating destination information of receiving the feedback frame; and
the frame body comprises an acknowledgement/paging control field and N user data acknowledgement/paging information fields, wherein each of the user data acknowledgement/paging information fields corresponds to one user in uplink multi-user data transmission, and N represents the total number of the users.

16. The primary node according to claim 15, wherein each of the user data acknowledgement/paging information fields comprises a paging indication field used for indicating whether a user corresponding to said user data acknowledgement/paging information field is able to send the uplink data in a subsequent uplink multi-user radio frame;

or, the acknowledgement/paging control field comprises a multi-user paging indication field used for indicating respectively whether each of the users is able to send the uplink data in a subsequent uplink multi-user radio frame;

wherein a mode of the multi-user paging indication field indicating whether each of the users is able to send the uplink data in the subsequent uplink multi-user radio frame is: indicating that the number of the users who are allowed to send the uplink data in the subsequent uplink multi-user radio frame is M, and then the first M corresponding users in the N user data acknowledgement/paging information fields are allowed to send the uplink data in the subsequent uplink multi-user radio frame, wherein M is less than or equal to N.

17. The primary node according to claim 16, wherein the acknowledgement/paging control field further comprises a frame format control field and a number field of the user data acknowledgement/paging information field, wherein the frame format control field is used for indicating that the feedback frame is used for acknowledgement/paging of the uplink multi-user data, and the number field of the user data acknowledgement/paging information field is used for indicating the number of the user data acknowledgement/paging information fields, a value of the number field of the user data acknowledgement/paging information field is the number N of the users in the uplink multi-user data transmission; and the user data acknowledgement/paging information field further comprises a user identity field, a traffic stream identity field, acknowledgement information sequence control information and an acknowledgement information bitmap, wherein the user identity field is used for representing the user corresponding to the user data acknowledgement/paging information field, the traffic stream identity field is used for representing an identity of a traffic stream in which a data unit corresponding to a right and wrong indication in the acknowledgement information bitmap is located, the acknowledgement information sequence control information is used for representing a sequence number range of the data unit corresponding to the right and wrong indication in the acknowledgement information bitmap, and the acknowledgement information bitmap is a bit map and each bit corresponds to a right and wrong indication of one data unit in the traffic stream.

18. The primary node according to claim 15, wherein the frame head further comprises a frame control field used for indicating that a frame in which the frame control field is located is the feedback frame carrying the multiple pieces of user data acknowledgement/paging information.

19. The primary node according to claim 15, wherein the frame head further comprises a duration field used for determining a length of the uplink multi-user radio frame for the users who are indicated to be able to send the uplink data in the next uplink multi-user data transmission.

20. A non-transitory computer readable storage medium storing computer executable instructions that are executable by a device processor to implement parallel multi-user data transmission by:
  receiving uplink parallel multi-user data at a primary node; and
  using, at the primary node, a radio frame carrying multiple pieces of user data acknowledgement information and multiple pieces of paging information as a feedback frame, using the multiple pieces of user data acknowledgement information to acknowledge the received uplink parallel multi-user data, and using the multiple pieces of paging information to indicate respectively whether each of users is able to continue to send uplink data.

* * * * *